US012719947B2

(12) United States Patent
Chehaibar et al.

(10) Patent No.: US 12,719,947 B2
(45) Date of Patent: Aug. 25, 2026

(54) SYSTEM AND METHOD FOR MANAGING PACKET TRANSMISSION ISSUES IN HIGH-PERFORMANCE COMPUTERS

(71) Applicant: BULL SAS, Les Clayes-sous-bois (FR)

(72) Inventors: Ghassan Chehaibar, Nice (FR); Alexandre Louvet, Rambouillet (FR)

(73) Assignees: BULL SAS, Les Clayes-sous-Bois (FR); Le Commissariat à l'énergie atomique et aux énergies alternatives, Paris (FR)

(*) Notice: Subject to any disclaimer, the term of this patent is extended or adjusted under 35 U.S.C. 154(b) by 68 days.

(21) Appl. No.: 19/011,834

(22) Filed: Jan. 7, 2025

(65) Prior Publication Data

US 2025/0233909 A1 Jul. 17, 2025

(30) Foreign Application Priority Data

Jan. 11, 2024 (EP) .................................... 24305074

(51) Int. Cl.
*H04L 67/10* (2022.01)
*H04L 47/12* (2022.01)
*H04L 67/145* (2022.01)

(52) U.S. Cl.
CPC .............. *H04L 67/10* (2013.01); *H04L 47/12* (2013.01); *H04L 67/145* (2013.01)

(58) Field of Classification Search
CPC ........ H04L 67/10; H04L 47/12; H04L 67/145
See application file for complete search history.

(56) References Cited

U.S. PATENT DOCUMENTS 11,153,041 B2 * 10/2021 Zhang .................. H04L 1/1874
2019/0140962 A1 * 5/2019 Thottethodi .......... H04L 47/283

FOREIGN PATENT DOCUMENTS

EP 0973294 3/2007

OTHER PUBLICATIONS

Dawson S et al, "Probing and Fault Injection of Dependable Distributed Protocols," Computer Journal, Oxford University Press, Surrey, GB, vol. 38, No. 4, Jan. 1, 1995, pp. 286-300.

European Search Report and Written Opinion issued in EP24305074.7, dated Jul. 1, 2024, and English translations thereof.

* cited by examiner

*Primary Examiner* — Bryan Y Lee
(74) *Attorney, Agent, or Firm* — ARC IP Law, PC; Joseph J. Mayo

(57) ABSTRACT

The invention concerns a High-Performance Computer that includes a plurality of nodes. Each node waits for a first time period after sending a packet, and retransmits the packet if an acknowledgement for the packet has not been received in the first time period. Each node also periodically sends a heartbeat message to each other node having a pending transaction with the node, waits for a second time period after sending a heartbeat message, and aborts the pending transaction if an acknowledgement for the heartbeat message has not been received in the second period. When receiving a negative acknowledgement after sending a packet, the each node retransmits the packet after a third time period starting from the reception of the negative acknowledgement, waits for a fourth time period and drop a packet if the node is congested during the fourth period, and sends a negative acknowledgement message.

8 Claims, 1 Drawing Sheet

SYSTEM AND METHOD FOR MANAGING PACKET TRANSMISSION ISSUES IN HIGH-PERFORMANCE COMPUTERS

This application claims priority to European Patent Application Number 24305074.7 filed 11 Jan. 2024, the specification of which is hereby incorporated herein by reference.

BACKGROUND OF THE INVENTION

Field of the Invention

The technical field of one or more embodiments of the invention is the field of high-performance computing, also referred to as "HPC".

The at least one embodiment of the invention concerns a system and method for managing packet transmission issues in a high-performance computer, and in particular for distinguishing between several types of packet transmission issues in a high-performance computer.

Description of the Related Art

High Performance Computing (HPC) requires high bandwidth, low latency interconnect network communications. It uses specialized hardware, such as network switches and NICs (Network Interface Controllers) and their associated software stacks, to create an interconnect network, configured to interconnect compute and storage nodes, to execute high-performance applications. In such interconnect networks, such as BXI (for "Bull eXascale Interconnect"), nodes communicate in particular by exchanging network packets.

When transferring packets between two nodes in an interconnect network, several issues can arise. These issues can result in delayed and/or lost packets.

In a first scenario, a packet can be dropped because a network link is down: in such a case, the packet must be retransmitted via a different path.

In a second scenario, the destination node can be congested: the packet should be retransmitted but with an increased waiting delay as compared to a waiting delay of the first transmission.

In a third scenario, the destination node can be down: the packet transfer should be failed and recovered at the application level (the first two scenarios are handled at the transport level).

The three cases described previously are currently handled with a single timeout on response reception. This does not permit to detect and resolve which issue arose. Indeed, in the congestion case, in traditional solutions, a packet is silently dropped, and it is the retransmission timeout that detects it: there is no distinction between link failure and intermediate node congestion. Another solution consists in sending periodically heartbeat messages to detect and handle network or system failures of nodes or daemons that belong to a network cluster, and to ensure high availability and fault tolerance of network services by using redundant nodes to take over the load of failed nodes. The heartbeat messages are sent by each node to all other nodes: it generates a lot of messages if the clusters have tens of thousands of nodes.

There is therefore a need for a solution enabling to detect and solve the three different network issues discussed previously which can arise when transferring network packets in a high-performance computer.

BRIEF SUMMARY OF THE INVENTION

One or more embodiments of the invention solves the above-mentioned problems by providing a solution to detect three different types of network issues arising in interconnect networks of high-performance computers.

According to at least one embodiment of the invention, this is satisfied by providing a Node of a High-Performance Computer, the node being interconnected to a plurality of other nodes via an interconnect network, the node being configured to:

- Wait for a first predefined time period after sending a packet to another node, and retransmit said packet if an acknowledgement for the packet has not been received in the first predefined time period, and
- Periodically send a heartbeat message to each other node having a pending transaction with said node, wait for a second predefined time period after sending a heartbeat message, and abort the pending transaction if an acknowledgement for the heartbeat message has not been received in the second predefined time period, and
- When receiving a negative acknowledgement after sending a packet to another node, retransmit said packet after the negative acknowledgement has been received, said packet being retransmitted after a third predefined time period starting from the reception of the negative acknowledgement, and
- Wait for a fourth predefined time period after receiving a packet and drop the packet if said node is congested during the fourth predefined time period and send a negative acknowledgement message to the node having sent the dropped packet.

Thanks to one or more embodiments of the invention, different types of network issues can be detected in an interconnect network of a high-performance computer, and different solutions can be implemented as a function of the detected issue. This permits a much more fine-tuned management of the different issues that the interconnect network may face. For example, the active waiting during the first predetermined time period permits to detect and solve broken links issues in the interconnect network, the periodical sending of heartbeat messages permits to detect if a receiving node is up or down and to act in consequence, and the waiting for a negative acknowledgment permits to detect when a receiving node is congested and to send the packet later, when the receiving node is less congested. At least one embodiment of the invention enables a sending node to detect and solve the three different issues, and to act as a receiving node by informing the other nodes if it is itself congested. That way, all the nodes can detect and manage all the different issues which could arise in an interconnect network of a high-performance computer. The data exchanges are thus more reliable and the network is more resilient.

The node of a high-performance computer according to one or more embodiments of the invention may also have one or more of the following characteristics, considered individually or according to any technically possible combinations thereof:

- the preceding claim wherein the first predefined time period is inferior to the second predefined time period and to the third predefined time period, and wherein the third predefined time period is inferior to the second predefined time period.
- the first predefined time period is comprised between 5 and 10 microseconds, wherein the second predefined time period is comprised between 5 and 15 seconds, and wherein the third predefined time period is comprised between 100 microseconds and 1 millisecond.

At least one embodiment of the invention relates to a High-Performance Computer comprising at least a plurality of nodes and the interconnect network interconnecting the plurality of nodes, the interconnect network being configured to transport packets between nodes of the plurality of nodes.

The high-performance computer according to at least one embodiment of the invention may also have one or more of the following characteristics, considered individually or according to any technically possible combinations thereof:

the interconnect network is a Bull eXascale Interconnect "BXI" network.

the High-Performance Computer comprises at least one cabinet and wherein at least one node of the plurality of nodes is a compute node comprised in a compute blade comprised in the at least one cabinet.

Another aspect of the invention relates to a method implemented by each node of the plurality of nodes of the high-performance computer according to one or more embodiments of the invention comprising at least:

Sending a packet to another node,

Wait for a first predefined time period after sending the packet, and retransmit said packet if an acknowledgement for the packet has not been received in the first predefined time period, and Periodically send a heartbeat message to each other node having a pending transaction with said node, wait for a second predefined time period after sending a heartbeat message, and abort the pending transaction if an acknowledgement for the heartbeat message has not been received in the second predefined time period, and When receiving a negative acknowledgement after sending a packet to another node, retransmit said packet after the negative acknowledgement has been received, said packet being retransmitted after a third predefined time period starting from the reception of the negative acknowledgement, and Wait for a fourth predefined time period after receiving a packet and drop the packet if said node is congested during the fourth predefined time period and send a negative acknowledgement message to the node having sent the dropped packet.

In at least one embodiment of the method, the negative acknowledgement and the heartbeat messages and the acknowledgements to the heartbeat messages are application-level messages, and the acknowledgement for the packet is a transport-level message.

Another aspect of one or more embodiments of the invention relates to a computer program product comprising instructions which, when the program is executed by the high-performance computer according to at least one embodiment of the invention, cause the high-performance computer to carry out the method according to at least one embodiment of the invention.

Another aspect of one or more embodiments of the invention relates to a computer-readable medium having stored thereon the computer program product of at least one embodiment of the invention.

At least one embodiment of the invention finds a particular interest in high-performance computers performing computations for transmitting network communications between compute nodes.

BRIEF DESCRIPTION OF THE FIGURES

Other characteristics and advantages of one or more embodiments of the invention will become clear from the description that is given thereof below, by way of indication and in no way limiting, with reference to the appended figures, among which.

DETAILED DESCRIPTION OF THE INVENTION

For greater clarity, identical or similar elements are marked by identical reference signs in all of the figures.

Figure 1:
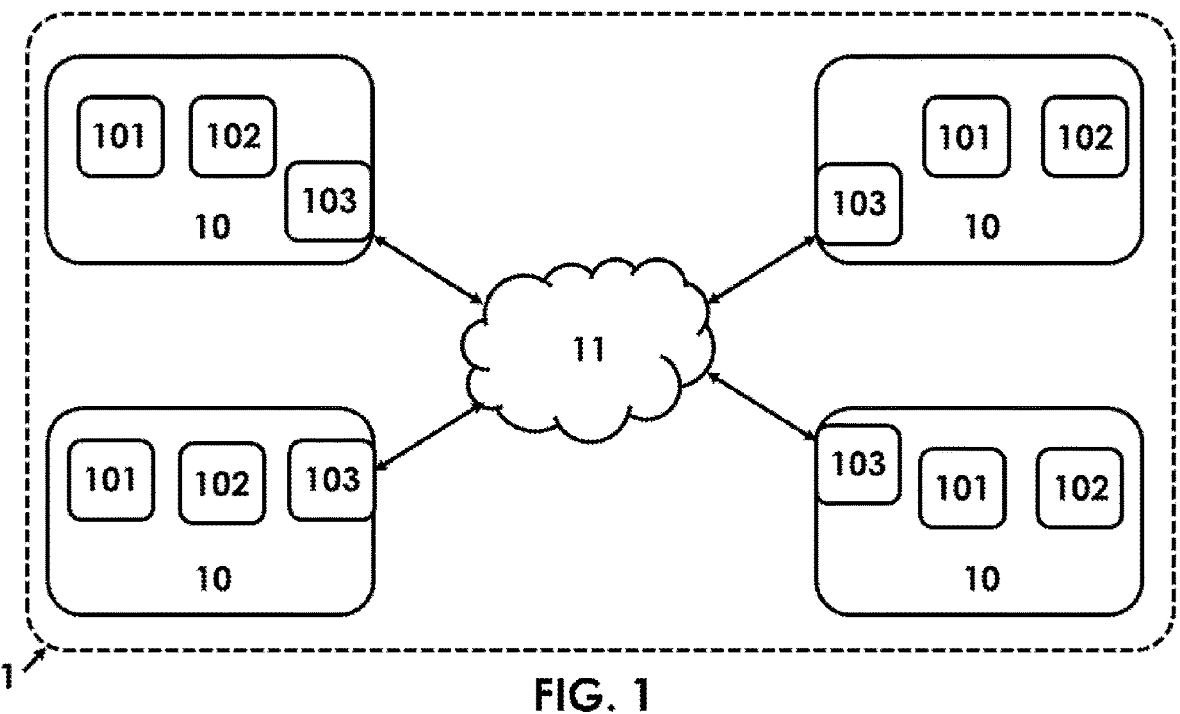
FIG. 1 is a schematic representation of a system configured to implement a method according to one or more embodiments of the invention.

At least one embodiment of the invention is a high-performance computer such as the one represented schematically in FIG. 1, wherein nodes implement different network issue management solutions.

FIG. 1 is a schematic representation of an embodiment of a system according to one or more embodiments of the invention.

The system 1 represented in FIG. 1 comprises a plurality of nodes 10 connected to a network 11. The nodes 10 can be comprised in a compute blade (not shown) of the high-performance computer. To do so, such a compute blade is comprised in a cabinet of the high-performance computer. A high-performance computer can comprise several cabinets, each cabinet comprising one or more compute blades and/or one or more storage blades, the cabinets being linked via a high-bandwidth, low-latency network. A compute blade preferably comprises several compute nodes 10.

A compute node 10 comprises a couple processor-memory 101 and 102. The compute node 10 comprises a processor 101 and a memory 102 communicatively coupled, so that the memory 102 can store instructions and the processor 101 can execute said instructions by accessing the memory 102. A processor is a device able to perform computations. When the instructions stored by the memory 102 are executed by the processor 101, the processor 101 performs the actions defined in the instructions. Examples of such actions are computations, and, in particular in high-performance computers, intensive computations, such as weather forecasting or simulation.

Each compute node 10 further comprises a network interface card 103, also referred to as "NIC". The network interface card 103 permits to communicate via the network 11, for example with another compute node 10, comprised in the same compute blade or not, and/or comprised in the same cabinet or not.

To execute an instance of a high-performance computing application, the processor 101 executes instructions stored by the memory 102 of the node 10.

The network 11 is an interconnect network, preferably a "BXI" network, also known as Bull eXascale Interconnect. Preferably, the network 11 is a BXI network version 2 or 3. The interconnect network 11 transports packets exchanged between the nodes 10. When a node 10 sends data to another node 10, the data is encapsulated in a network packet which is routed through the network 11 towards its destination. At any point in time, two nodes 10 exchanging data are said to have a pending transaction, a transaction being an exchange of data.

At least one embodiment of the invention permits to distinguish between different network issues which can arise when transmitting data packets between nodes. To solve this problem, each node 10 of the plurality of nodes 10 is configured to implement three different timeouts and therefore three different methods. By "configured to implement a method" is meant that a node stores instructions which, when executed by the node, lead the node to perform said method. This can be done by implementing a software for example.

First, to detect a broken network link, each node 10 of the high-performance computer 1 is configured to wait for a first predefined time period after sending a packet to another node 10, and to retransmit said packet when an acknowledgement for the packet has not been received during the first predefined time period. Indeed, when sending a packet from a first node 10 to a second node 10, the second node 10 should answer to the first node 10, with an acknowledgement, that it has received the packet. If the first node 10 does not receive the acknowledgement within the first predetermined time period, it can be deduced that a network link between the first node 10 and the second node 10 is broken, and that the packet should be sent again because there is a high chance it has been dropped. The packet will then take another path to reach the second node 10, because the fabric routing has been updated in the meantime. The first predefined time period is for example comprised between 5 and 10 microseconds, as it is not necessary to wait for an extended period of time as several paths coexist between the first and second nodes 10. This first timeout is a transport-level (of the OSI ("Open Systems Interconnection") model) timeout, for example implemented using TCP.

Secondly, to detect that a destination node 10 is down, the first node 10 is also configured to periodically send a heartbeat message to each other node 10 with which the first node 10 has a pending transaction, that is with each other node 10 with which packet(s) is (are) being exchanged. The first node 10 then waits for a second predefined time period after sending each heartbeat message and aborts the transaction, that is it aborts the sending of the packet, when an acknowledgement for the heartbeat message has not been received within the second predefined time period. This second timeout is an application-level timeout, meaning that it is implemented by the first node 10 at the application level of the OSI model. The first node 10 drops the transaction when it does not receive an acknowledgement to a heartbeat message by the receiving second node 10. The heartbeats and acknowledgements are therefore application-level messages. This permits to detect that the transaction has failed, and to not uselessly retransmit the data. The second predefined time period is for example of the duration of two periods separating the sending of heartbeats, that is of two heartbeats, and can be comprised between 5 and 15 seconds, preferably of the order of 10 seconds. A timeout of long duration is chosen to avoid flooding the network with the heartbeat messages, and short enough to detect that a node has died (smaller than a reboot time of a node, for instance). This second timeout has a long duration as it is needed to make sure the node is effectively down, for example because of the failure of its operating system or of one of its components. After the transactions have been dropped, the transactions have to be initiated again when it is made sure that the destination node 10 is up.

Thirdly, to detect the network congestion of nodes 10, the first node 10 is also configured to retransmit a sent packet when a negative acknowledgement has been received from the destination node 10 of said sent packet. The packet is only retransmitted after a third predefined time period starting from the reception of the negative acknowledgement. This also necessitates all the nodes 10 of the plurality of nodes 10 of the high-performance computer 1 to be configured to send a negative acknowledgement when they are congested at the application-level. Indeed, in one or more embodiments of the invention, the third timeout is associated to a negative acknowledgement which is an application-level negative acknowledgement and not a network-level negative acknowledgement. The negative acknowledgement is not used for packet error, but solely to inform each node 10 having a pending transaction with the congested node 10 that the node 10 is congested. When a node 10 is congested at the application-level, all the packets are in a buffer and the node 10 cannot process all the packets of the buffer. When the receiving node 10 detects that it will not be able to handle all the packets in its buffers, it sends a negative acknowledgement "NACK BUSY" to all the nodes 10 having a pending transaction with it to inform said nodes 10 that the congested node 10 will drop all the packets present in its buffers. The informed nodes 10 are then configured to retransmit the packets after having waited for the third predefined time period starting from the reception of the negative acknowledgement. This permits to make sure the congested node 10 had time to drop the packets it had to receive and to decongest itself before receiving packets again. The third predefined time period is preferably comprised between 750 milliseconds and 2 seconds, preferably the third predefined time period is 1 second. A fourth predefined time period is a time period after which a node drops packets when it detects it is busy. Such a fourth predefined time period is preferably comprised between 1 and 10 microseconds and the node sends a negative acknowledgement after this fourth time period, which starts from the detection, by the node, of the fact that the node is busy. This detection happens when a packet is received and cannot be handled because of a lack of resources, as the node is busy. At least one embodiment of the invention also concerns a method of managing network issues. Such a method according to one or more embodiments of the invention is represented schematically in FIG. 2. The method 2, in at least one embodiment, is implemented by each node 10 of the plurality of nodes 10 of the high-performance computer 1.

The method 2 first comprises a step 21 of sending a packet to another node 10.

After sending a packet to another node 10 at step 21, the method 2 comprises a step 22 of waiting for the first predefined time period after sending the packet and retransmit said packet when an acknowledgement for the packet has not been received in the first predefined time period. This step 22 of the method 2 is therefore only performed if an acknowledgement for the packet has not been received in the first predefined time period.

After sending a packet to another node at step 21, the method 2 comprises a step 23 of, when receiving a negative acknowledgement from the destination node 10 of the packet, retransmitting said packet after the negative acknowledgement has been received, said packet being retransmitted after a third predefined time period starting from the reception of the negative acknowledgement. This step 23 of the method 2 is therefore only performed if the negative acknowledgement has been received.

The method also comprises a step 24 of periodically sending a heartbeat message to each other node 10 having a pending transaction with said node 10, wait for a second predefined time period after sending a heartbeat message, and abort the pending transaction when an acknowledgement for the heartbeat message has not been received in the second predefined time period. This step 24 of the method 2 is therefore only performed if an acknowledgement for the heartbeat message has not been received in the second predefined time period.

The method further comprises a step 25 of dropping a received packet when the node 10 implementing the method is congested and of sending a negative acknowledgement message to the node 10 having sent the dropped packet. This permits all the other nodes 10 of the high-performance computer 1 to be able to perform the step 23 of the method 2.

Figure 2:
FIG. 2 is a schematic representation of a method according to one or more embodiments of the invention.
Figure 2:

The step 21 to 25 of the method 2 can be performed in any order, as long as the step 22, the step 23 and the step 24 are performed after the step 21 of sending a packet. An example of an order for the steps 21 to 25 is shown at FIG. 2, showing the three issues arising for the same node 10 performing the method 2, for example for different packets sent by the node 10 and if the node 10 is congested.

The invention claimed is:

1. A node of a High-Performance Computer, the node being interconnected to a plurality of other nodes via an interconnect network, the node being configured to:

wait for a first predefined time period after sending a packet to another node, and retransmit said packet if an acknowledgement for the packet has not been received in the first predefined time period, and periodically send a heartbeat message to each other node having a pending transaction with said node, wait for a second predefined time period after sending said heartbeat message, and abort the pending transaction if an acknowledgement for the heartbeat message has not been received in the second predefined time period, and when receiving a negative acknowledgement after said sending said packet to said another node, retransmit said packet after the negative acknowledgement has been received, said packet being retransmitted after a third predefined time period starting from the receiving of the negative acknowledgement, and wait for a fourth predefined time period after receiving said packet and drop the packet if said node is congested during the fourth predefined time period and send a negative acknowledgement message to the node having sent the packet that is dropped, wherein the interconnect network is a Bull exascale Interconnect (BXI) network.

2. The node according to claim 1, wherein the first predefined time period is inferior to the second predefined time period and to the third predefined time period, and wherein the third predefined time period is inferior to the second predefined time period.

3. The node according to claim 1, wherein the first predefined time period is comprised between 5 and 10 microseconds, wherein the second predefined time period is comprised between 5 and 15 seconds, and wherein the third predefined time period is comprised between 100 microseconds and 1 millisecond.

4. A High-Performance Computer comprising:

a plurality of nodes, wherein a node of the plurality of nodes is configured to wait for a first predefined time period after sending a packet to another node, and retransmit said packet if an acknowledgement for the packet has not been received in the first predefined time period, and periodically send a heartbeat message to each other node having a pending transaction with said node, wait for a second predefined time period after sending said heartbeat message, and abort the pending transaction if an acknowledgement for the heartbeat message has not been received in the second predefined time period, and when receiving a negative acknowledgement after said sending said packet to said another node, retransmit said packet after the negative acknowledgement has been received, said packet being retransmitted after a third predefined time period starting from the receiving of the negative acknowledgement, and wait for a fourth predefined time period after receiving said packet and drop the packet if said node is congested during the fourth predefined time period and send a negative acknowledgement message to the node having sent the packet that is dropped, and an interconnect network interconnecting the plurality of nodes, wherein the interconnect network is configured to transport packets between nodes of the plurality of nodes, wherein the interconnect network is a Bull exascale Interconnect (BXI) network.

5. The High-Performance Computer according to claim 4, further comprising at least one cabinet and wherein at least one node of the plurality of nodes is a compute node comprised in a compute blade comprised in the at least one cabinet.

6. A method implemented by each node of a plurality of nodes of a high-performance computer, the each node being interconnected to other nodes of the plurality of nodes via an interconnect network said method comprising:

sending a packet to another node via a first node, waiting for a first predefined time period after the sending the packet, and retransmitting said packet if an acknowledgement for the packet has not been received in the first predefined time period, and periodically sending a heartbeat message to each other node having a pending transaction with said first node, waiting for a second predefined time period after periodically sending the heartbeat message, and aborting the pending transaction if an acknowledgement for the heartbeat message has not been received in the second predefined time period, and when receiving a negative acknowledgement after the sending the packet to the another node, retransmitting said packet after the negative acknowledgement has been received, said packet being retransmitted after a third predefined time period starting from the receiving of the negative acknowledgement, and waiting for a fourth predefined time period after receiving the packet and dropping a received packet when said first node is congested during the fourth predefined time period and sending a negative acknowledgement message to a node that sent the packet that is dropped, wherein the interconnect network is a Bull exascale Interconnect (BXI) network.

7. The method according to claim 6, wherein the negative acknowledgement and the heartbeat message and the acknowledgement and the negative acknowledgement to the heartbeat message are application-level messages, and wherein the acknowledgement for the packet is a transport-level message.

8. The method according to claim 6, wherein the method is carried out by a computer program product comprising instructions, wherein the computer program product is executed by the high-performance computer, wherein the computer program product is stored in a non-transitory computer-readable medium.

* * * * *